(12) United States Patent
Sasaki

(10) Patent No.: US 11,623,695 B2
(45) Date of Patent: Apr. 11, 2023

(54) VEHICLE POP-UP HOOD APPARATUS

(71) Applicant: HONDA MOTOR CO., LTD., Tokyo (JP)

(72) Inventor: Kazutada Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 523 days.

(21) Appl. No.: 16/774,021

(22) Filed: Jan. 28, 2020

(65) Prior Publication Data

US 2020/0269931 A1    Aug. 27, 2020

(30) Foreign Application Priority Data

Feb. 22, 2019    (JP) .............................. JP2019-030614

(51) Int. Cl.
*B62D 25/12*    (2006.01)
*E05B 77/12*    (2014.01)
*E05B 83/24*    (2014.01)

(52) U.S. Cl.
CPC .............. *B62D 25/12* (2013.01); *E05B 77/12* (2013.01); *E05B 83/243* (2013.01)

(58) Field of Classification Search
CPC ......... B62D 25/12; E05B 77/12; E05B 81/16; E05B 83/243; E05B 77/08; B60R 21/38
See application file for complete search history.

(56) References Cited

U.S. PATENT DOCUMENTS

| 6,415,882 | B1 | 7/2002 | Schuster et al. |
| 10,800,374 | B2 * | 10/2020 | Szente .................... E05B 83/24 |
| 10,988,105 | B2 * | 4/2021 | Gunji ...................... B60R 21/38 |

(Continued)

FOREIGN PATENT DOCUMENTS

| CN | 105829172 | 8/2016 |
| DE | 10108880 | 9/2002 |
| DE | 10311533 | 12/2004 |

(Continued)

OTHER PUBLICATIONS

Chinese Office Action for Chinese Patent Application No. 202010075991.5 dated Mar. 3, 2022.

(Continued)

*Primary Examiner* — Christine M Mills
*Assistant Examiner* — Thomas L Neubauer
(74) *Attorney, Agent, or Firm* — Amin, Turocy & Watson, LLP

(57) ABSTRACT

A pop-up hood apparatus includes a hood, a hood lock mechanism, a support mechanism, an actuator, and a pair of auxiliary support parts. The support mechanism has a movable block and a base block. Each auxiliary support part includes: a load reception block that is capable of supporting the side edge part of the hood from below; a biasing member that biases the load reception block upward; and a displacement regulation member that regulates an upward displacement from an initial position of the load reception block against a biasing force of the biasing member. The movable block and the displacement regulation member are interlocked by an interlock part that displaces the displacement regulation member in a regulation release direction in response to an upward displacement of the movable block by the actuator.

4 Claims, 7 Drawing Sheets

(56) References Cited

U.S. PATENT DOCUMENTS 11,148,634 B2 * 10/2021 Sasaki .................... B60R 21/38

FOREIGN PATENT DOCUMENTS

| | | |
|---|---|---|
| DE | 10331047 | 1/2005 |
| JP | 49-110432 | 9/1974 |
| JP | 2004-299614 | 10/2004 |
| JP | 2014-034350 | 2/2014 |
| JP | 2015-101268 | 6/2015 |
| JP | 2016-088399 | 5/2016 |
| JP | 2016-130108 | 7/2016 |
| WO | 2018/057833 | 3/2018 |

OTHER PUBLICATIONS

Japanese Notice of Allowance for Japanese Patent Application No. 2019-030614 dated Apr. 5, 2022.

* cited by examiner

VEHICLE POP-UP HOOD APPARATUS

CROSS-REFERENCE TO RELATED APPLICATION

Priority is claimed on Japanese Patent Application No. 2019-030614, filed on Feb. 22, 2019, the contents of which are incorporated herein by reference.

BACKGROUND

Field of the Invention

The present invention relates to a vehicle pop-up hood apparatus in which a hood is displaced upward in an emergency.

Background

As a vehicle hood such as a bonnet hood, a pop-up hood apparatus is known which displaces a hood upward using an actuator in an emergency and flexibly accepts an impact by the hood (for example, refer to Japanese Unexamined Patent Application, First Publication No. 2016-88399).

In the pop-up hood apparatus described in Japanese Unexamined Patent Application, First Publication No. 2016-88399, a hood lock mechanism that fixes a front edge part of the hood to a vehicle body is supported via a vertically slidable mechanism at a substantially middle part in a vehicle width direction and is locked and fixed to an initial position by a locking part. A pair of actuators are arranged below each of right and left sides of the front edge part of the hood. When an input of an impact is detected by a sensor, both actuators operate and push the front edge part of the hood upward.

The actuator and the locking part of the hood lock mechanism at a substantially middle in the width direction are operable in an interlocking manner by an interlocking mechanism using an operation cable. When the actuator operates at the time of impact detection, the locking of the hood lock mechanism is released in conjunction with the operation of the actuator. Thereby, the hood lock mechanism becomes slidable upward, and the front edge part of the hood moves upward by the operation of the right and left actuators.

SUMMARY

The pop-up hood apparatus described in Japanese Unexamined Patent Application, First Publication No. 2016-88399 has a structure which moves the hood upward by the pair of actuators arranged below the right and left side edge parts of the hood in an emergency. Therefore, in the pop-up hood apparatus described in Japanese Unexamined Patent Application, First Publication No. 2016-88399, it is necessary to provide a plurality of expensive actuators, and manufacturing costs tend to increase.

As a countermeasure, it is conceivable that only one actuator for raising the hood be arranged in a middle region in the vehicle width direction of the hood. However, in this case, when the hood is raised by the actuator, the behavior of the right and left side edge parts of the hood becomes unstable, and it becomes difficult to stably receive an impact that is input to an upper part of the hood.

An aspect of the present invention provides a vehicle pop-up hood apparatus capable of stably receiving an impact that is input to an upper part of a hood while preventing an increase in manufacturing costs.

A vehicle pop-up hood apparatus according to an aspect of the present invention includes: a hood that closes an opening part at an outer part of a vehicle body; a hood lock mechanism that fixes a substantially middle part in a vehicle width direction of the hood to the vehicle body; a support mechanism having a movable block that supports the hood lock mechanism and a base block that is fixed to the vehicle body and that supports the movable block such that the movable block is movable upward and downward; an actuator that displaces the movable block upward in a case where a predetermined condition is satisfied; and a pair of auxiliary support parts that support side edge parts on both sides in the vehicle width direction of the hood from below when the hood is displaced upward by an operation of the actuator, wherein each of the auxiliary support parts includes: a load reception block that is capable of supporting the side edge part of the hood from below; a biasing member that biases the load reception block upward; and a displacement regulation member that regulates an upward displacement from an initial position of the load reception block against a biasing force of the biasing member, and the movable block and the displacement regulation member are interlocked by an interlock part that displaces the displacement regulation member in a regulation release direction in response to an upward displacement of the movable block by the actuator.

Normally, the hood closes the opening part of the vehicle body in a state of being fixed to the hood lock mechanism. In a case where a predetermined condition is satisfied from this state, the actuator operates and displaces the movable block of the support mechanism upward. When the movable block moves upward, the hood lock mechanism moves upward together with the movable block while maintaining the state in which the hood is fixed to the hood lock mechanism. When the hood lock mechanism moves upward in this way, the displacement regulation member of each auxiliary support part is interlocked with the upward displacement of the movable block via the interlock part and releases the upward displacement regulation with respect to each load reception block. When the upward displacement regulation of each load reception block is released, each load reception block moves upward by receiving a biasing force of the biasing member and supports the side edge parts on both sides in the vehicle width direction of the hood from below. As a result, the side edge parts of the hood are supported by the support mechanism, and it becomes possible to stably support an impact that is input from above the hood.

The predetermined condition may be a condition for determining an emergency.

In this case, when the actuator operates in an emergency, the side edge part of the hood is supported by the support mechanism, and it becomes possible to stably support an impact that is input from above the hood.

The interlock part may include: an operation cable having one end part that is connected to the displacement regulation member; and an operation conversion part that converts the upward displacement of the movable block into a retraction operation of another end part of the operation cable.

In this case, when the movable block moves upward by the operation of the actuator, the upward displacement of the movable block is converted into the retraction operation of the other end part of the operation cable by the operation conversion part. Thereby, the displacement regulation member is operated to the regulation release direction by the retraction of the operation cable.

The pop-up hood apparatus of the present configuration has an advantage in that since the upward displacement of the movable block is subjected to the operation conversion and is then transmitted via the operation cable having a high degree of freedom of deformation to the displacement regulation member at the side part in the vehicle width direction, the degree of freedom of arrangement of a device in the vehicle is high. Accordingly, when the present configuration is employed, it is possible to arrange a device relatively easily even in a vehicle having a limited arrangement space.

The operation conversion part may be constituted of a cable retraction lever of which a rotation amount is controlled by a cam mechanism.

In this case, since the retraction of the operation cable can be controlled with good accuracy by the shape of a cam surface of the cam mechanism, it is possible to displace the displacement regulation member as desired in accordance with the upward displacement of the movable block.

The pop-up hood apparatus may include a load support part that comes into contact with the vehicle body and a lower surface of the load reception block such that a load is transmittable to the vehicle body and the lower surface of the load reception block in response to an upward displacement of the load reception block by a predetermined amount or more.

In this case, when the predetermined condition is satisfied and when the load reception block receives the biasing force of the biasing member and is displaced upward by a predetermined amount or more, the load support part comes into contact with the lower surface of the load reception block, and the downward movement of the side edge part of the hood is regulated by the load support part. Accordingly, when the present configuration is employed, it becomes possible to further stably support an impact that is input from above the hood by the side edge part of the hood.

The load support part may be constituted of the displacement regulation member.

In this case, since it is not necessary to provide a dedicated load support part separately, it becomes possible to reduce the number of components and further reduce manufacturing costs.

The aspect of the present invention has a configuration in which the load reception block on both sides in the vehicle width direction moves upward by receiving the biasing force of the biasing member in conjunction with the operation of one actuator that displaces the movable block upward. Therefore, it is possible to reduce manufacturing costs by minimizing the number of actuators installed that move the hood upward when the predetermined condition is satisfied.

Further, in the aspect of the present invention, since the pair of auxiliary support parts can support the side edge parts on both sides in the vehicle width direction of the hood from below at the time of operation of the actuator, it is possible to stably receive an impact that is input from above the hood in a case where a predetermined condition is satisfied.

DESCRIPTION OF EMBODIMENTS

Hereinafter, an embodiment of the present invention will be described with reference to the drawings. In the following descriptions, frontward, rearward, upward, downward, rightward, and leftward directions mean frontward, rearward, upward, downward, rightward, and leftward directions of a vehicle, unless otherwise specified. In an appropriate position of the drawings, an arrow UP that indicates an upward direction of the vehicle, an arrow FR that indicates a frontward direction of the vehicle, and an arrow LH that indicates a left side direction of the vehicle are shown.

(Vehicle Configuration)

Figure 1:
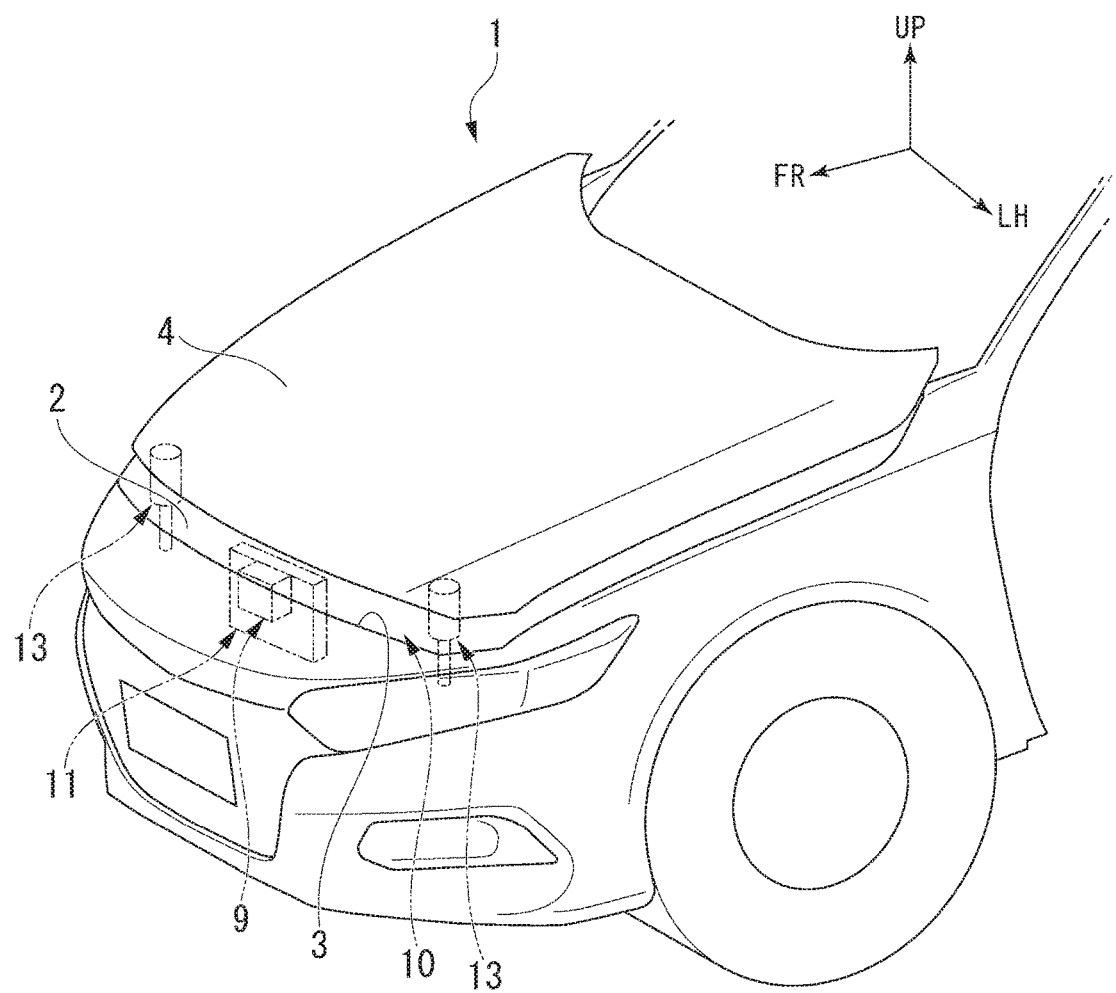
FIG. 1 is a perspective view showing a state in which a vehicle pop-up hood apparatus according to an embodiment is operated.
Figure 2:
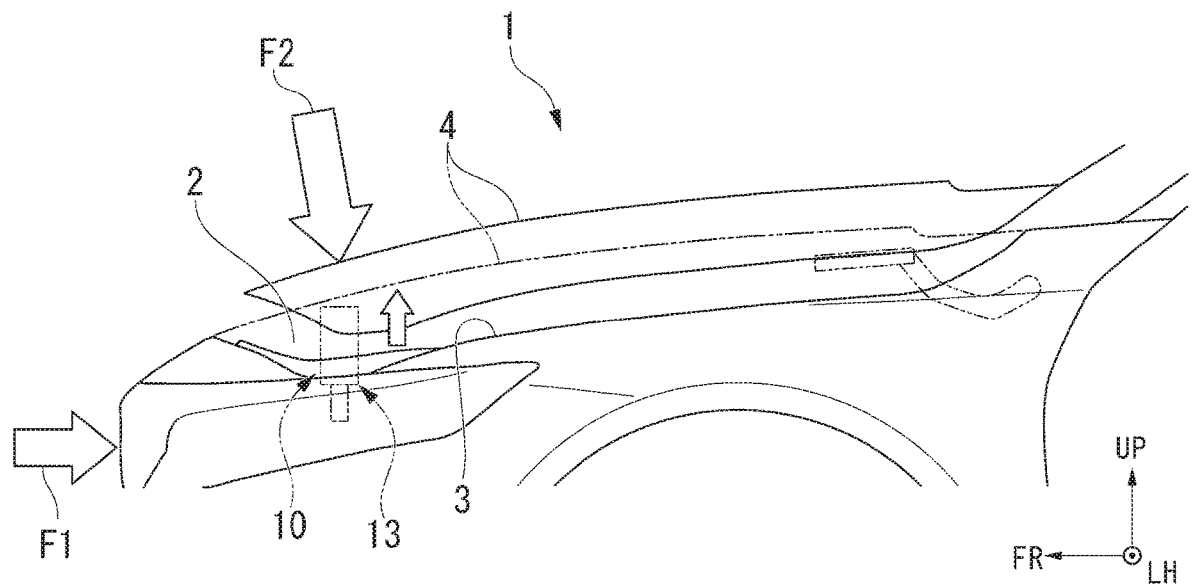
FIG. 2 is a side view showing a state in which the vehicle pop-up hood apparatus according to the embodiment is operated.
Figure 3:
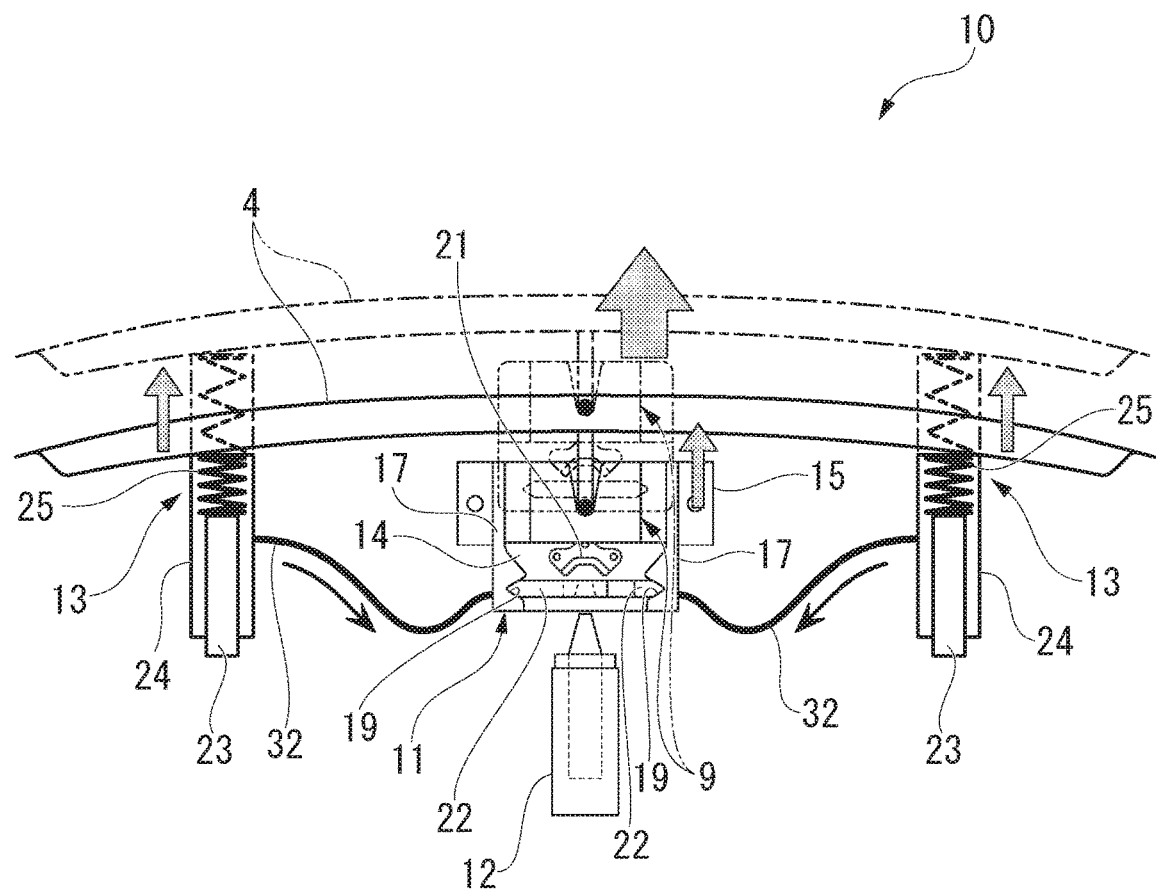
FIG. 3 is a front view showing a schematic configuration of the pop-up hood apparatus according to the embodiment.

FIG. 1 is a perspective view of a front part of a vehicle 1 according to the embodiment seen from a frontward upward direction. FIG. 2 is a left side view of the front part of the vehicle 1. FIG. 3 is a front view showing a schematic configuration of a pop-up hood apparatus 10 that is provided on the front part of the vehicle 1.

The vehicle 1 includes a drive room 2 in which a drive source such as an engine or a motor is arranged in front of a vehicle room. An opening part 3 having a substantially rectangular shape is provided on an upper part of the drive room 2. The opening part 3 is closed by a hood 4 such that the opening part 3 is openable and closeable. The hood 4 is, for example, formed by bonding a plurality of metal plates and has a substantially hollow structure. A hinge (not shown) is attached to right and left side edge parts close to a rear portion of the opening part 3 of the vehicle body. A movable piece of the hinge is connected to right and left side edge portions of a rear part of the hood 4. The hood 4 is openable and closeable toward a forward direction with respect to the opening part 3 around a rotation axis of the right and left hinges in normal use.

A hood lock mechanism 9 is provided on a front middle portion of the opening part 3 of the vehicle body. The hood lock mechanism 9 fixes a front part of the closed hood 4 to the vehicle body and maintains a locked state. The locking of the hood lock mechanism 9 can be released by a lever operation from the inside of a vehicle room or the like.

In the vehicle 1 of the present embodiment, the drive room 2 is arranged on the front part of the vehicle body, and the opening part 3 above the drive room 2 is closed by the hood 4; however, a similar structure can be applied to a vehicle in which a luggage room is arranged on the front part of the vehicle body, and an opening part above the luggage room is closed by a hood.

(Pop-Up Hood Apparatus)

The pop-up hood apparatus 10 includes the hood 4, the hood lock mechanism 9, a support mechanism 11 that supports the hood lock mechanism 9 to the vehicle body such that the hood lock mechanism 9 is movable upward and downward, an actuator 12 that displaces a front middle region of the hood 4 upward in a case where a predetermined condition is satisfied (for example, in a case where an impact F is input, and a condition for determining an emergency is satisfied), and a pair of auxiliary support parts 13 that support right and left side edge parts close to a front part of the hood 4 from below when the actuator 12 operates.

Figure 4:
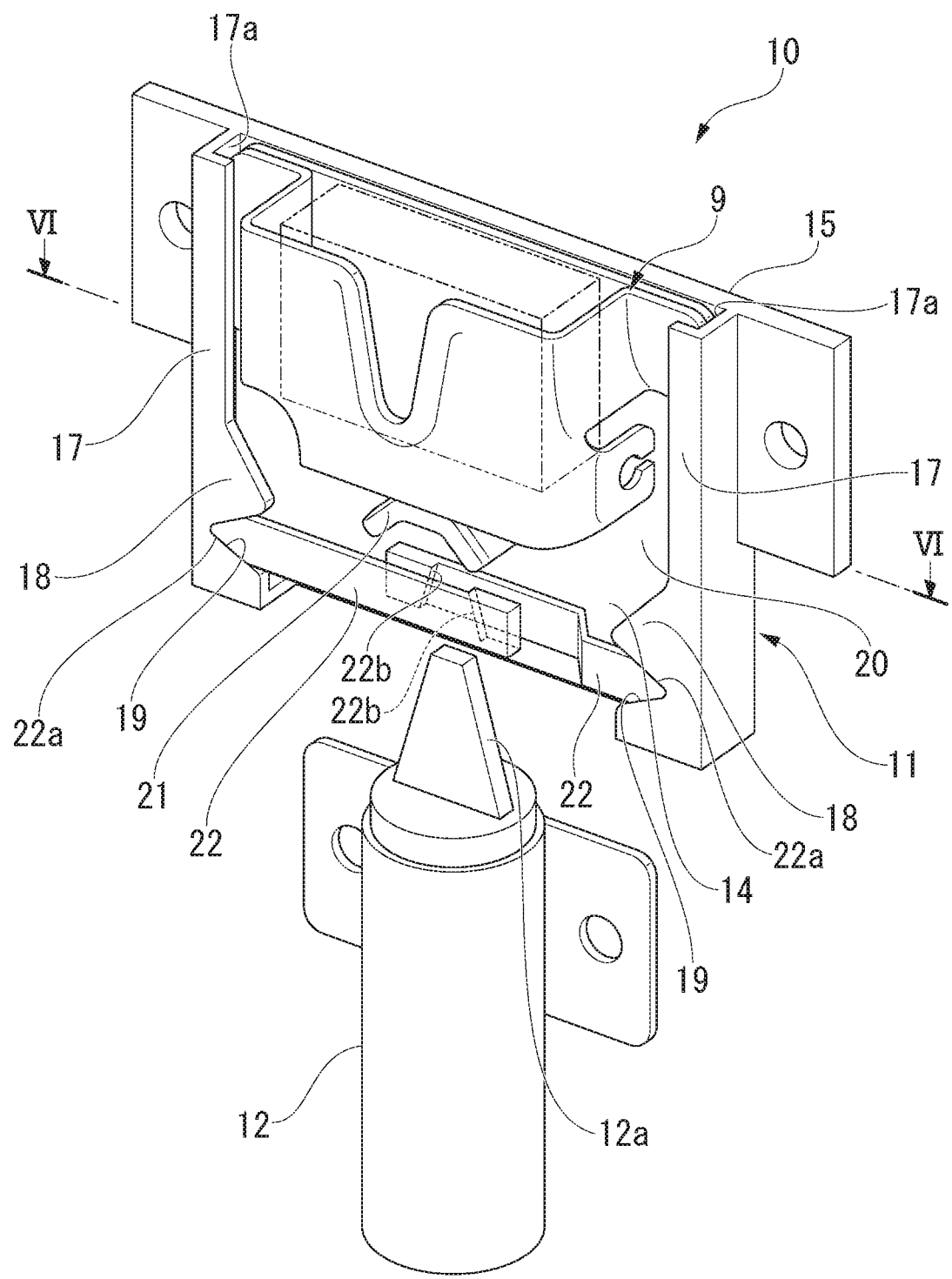
FIG. 4 is a perspective view showing part of the pop-up hood apparatus according to the embodiment.
Figure 5:
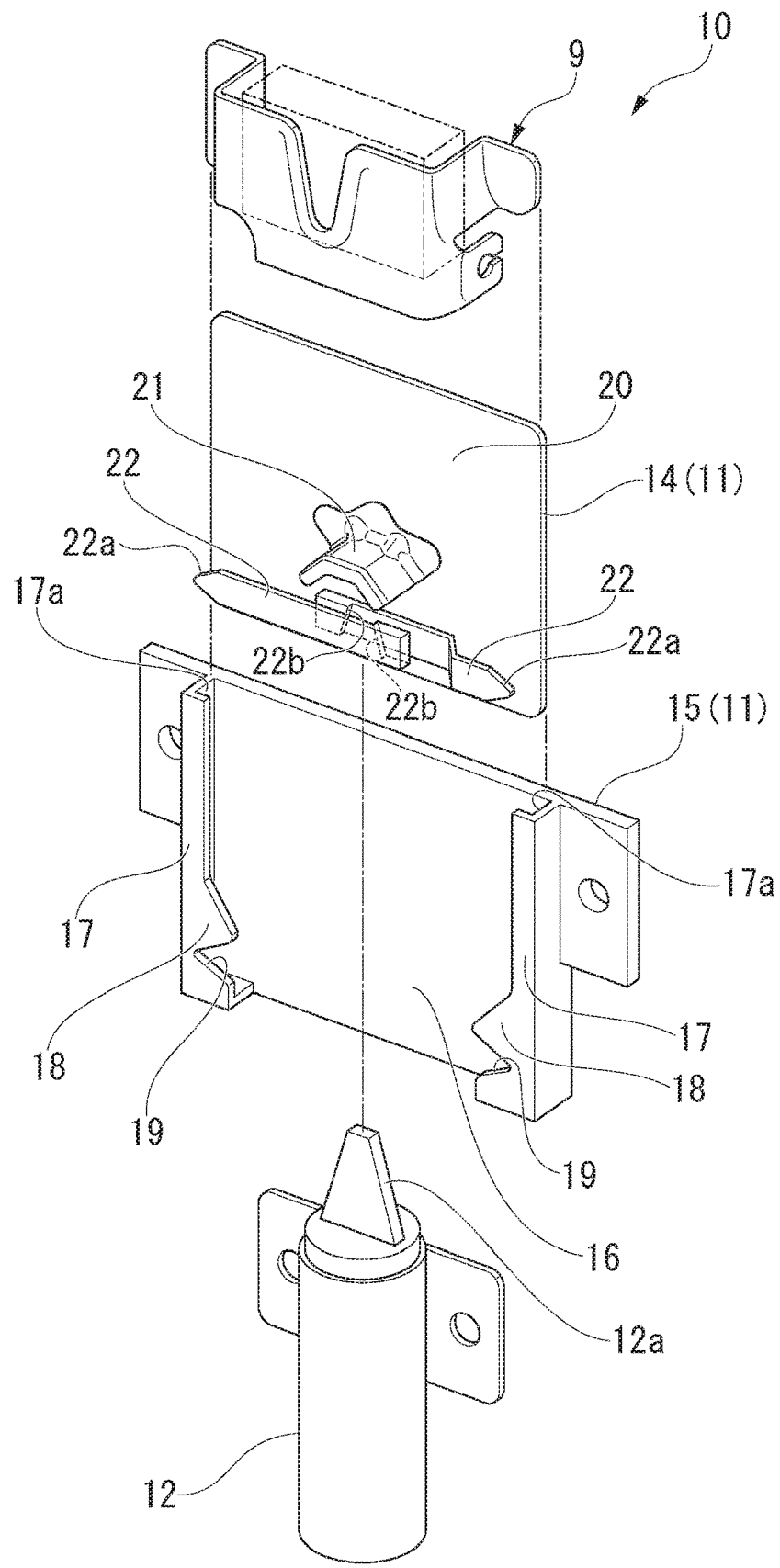
FIG. 5 is an exploded perspective view of part of the pop-up hood apparatus according to the embodiment.
Figure 6:
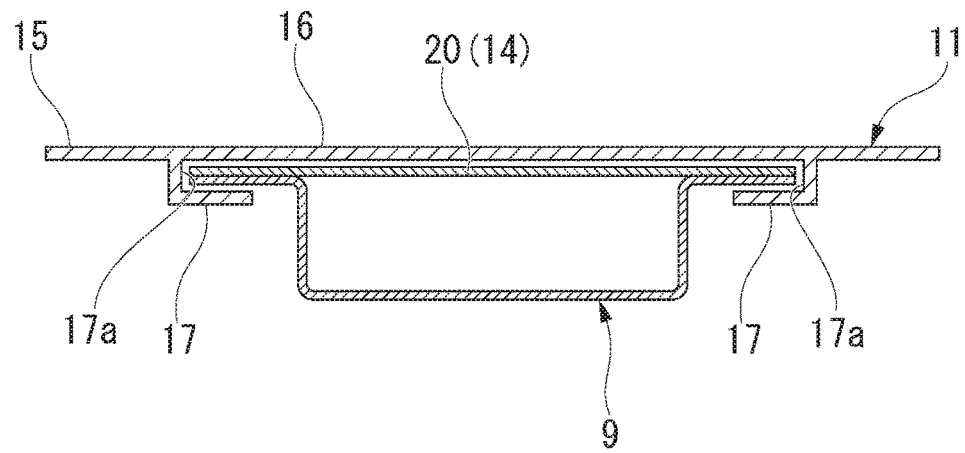
FIG. 6 is a cross-sectional view along a VI-VI line of FIG. 4 of the pop-up hood apparatus according to the embodiment.

FIG. 4 is a perspective view of the support mechanism 11 that supports the hood lock mechanism 9 and the actuator 12. FIG. 5 is a view showing a disassembled support mechanism 11 together with the actuator 12. FIG. 6 is a cross-sectional view along a VI-VI line of FIG. 4 of the support mechanism 11.

The support mechanism 11 includes a movable block 14 that supports the hood lock mechanism 9 and a base block 15 that is fixed to a substantially middle portion in a vehicle width direction of the front part of the vehicle body and that supports the movable block 14 such that the movable block 14 is slidable in a vertical direction.

The base block 15 includes a fixation base wall 16 that is fixed to a skeleton member at the front part of the vehicle body by bolt fastening or the like, and a pair of right and left guide rail parts 17 that are provided to protrude on a front surface of the fixation base wall 16. The right and left guide rail parts 17 are formed such that guide grooves 17a substantially along the vertical direction face each other in the vehicle width direction. A projection part 18 that projects inward in the vehicle width direction is provided in the vicinity of a lower end of each of the right and left guide rail parts 17, and an engagement groove 19 that is recessed in a substantially V shape is formed on an inner edge portion in the vehicle width direction of the projection part 18. A shape of the engagement groove 19 is not limited to a substantially V shape and may be an arbitrary shape that can be engaged with a locking part 22a of a locking claw 22 described below.

The movable block 14 includes a movable base wall 20 having right and left side edge parts that are slidably supported by the right and left guide rail parts 17 of the base block 15, a load reception member 21 that is arranged on and fixed to a middle part in the vehicle width direction of a front surface of the movable base wall 20, and a pair of right and left locking claws 22 that are supported on the front surface of the movable base wall 20 at a lower position than the load reception member 21 such that the right and left locking claws 22 are slidable in the vehicle width direction.

The load reception member 21 is a member with which a wedge part 12a at an upper end of a movable part of the actuator 12 comes into contact and which receives a push-up load from the actuator 12. The push-up load is applied to the load reception member 21 from the actuator 12, and thereby, the movable base wall 20 is guided by the right and left guide rail parts 17 and displaces upward.

The locking claw 22 includes a locking part 22a that has a substantially triangular shape and that is inserted into and engaged with a corresponding engagement groove 19 of the right and left guide rail parts 17. The shape of the locking part 22a is not limited to a substantially triangular shape and may be a shape that is engageable with the engagement groove 19. Each locking claw 22 is biased by a spring (not shown) in a direction in which the locking part 22a is inserted into the corresponding engagement groove 19. A cam surface 22b that is sloped outward in the vehicle width direction from an upper end side toward a lower end side is provided on each locking claw 22. A sloped portion of the wedge part 12a comes into slidable contact with each cam surface 22b when the wedge part 12a of the actuator 12 moves upward at the time of operation of the actuator 12. Each locking claw 22 slides in a direction away from the engagement groove 19 by the sloped cam surface 22b being pressed by the sloped portion of the wedge part 12a. Thereby, the locking part 22a of the locking claw 22 is removed from the corresponding engagement groove 19, and the locking of the movable block 14 is released.

The actuator 12 is constituted of, for example, a powder-operation-type cylinder device which receives a signal from a controller (not shown) and of which a rod part protrudes or the like. In the present embodiment, when an impact detection sensor (not shown) (for example, an acceleration sensor) that is provided on a front bumper or the like detects a predetermined impact or more, the controller outputs an operation signal to the actuator 12. The rod part of the actuator 12 protrudes by a powder operation or the like, and thereby, the wedge part 12a at a front end of the actuator 12 releases the locking of the movable block 14 described above and pushes up the movable block 14 via the load reception member 21.

Figure 7:
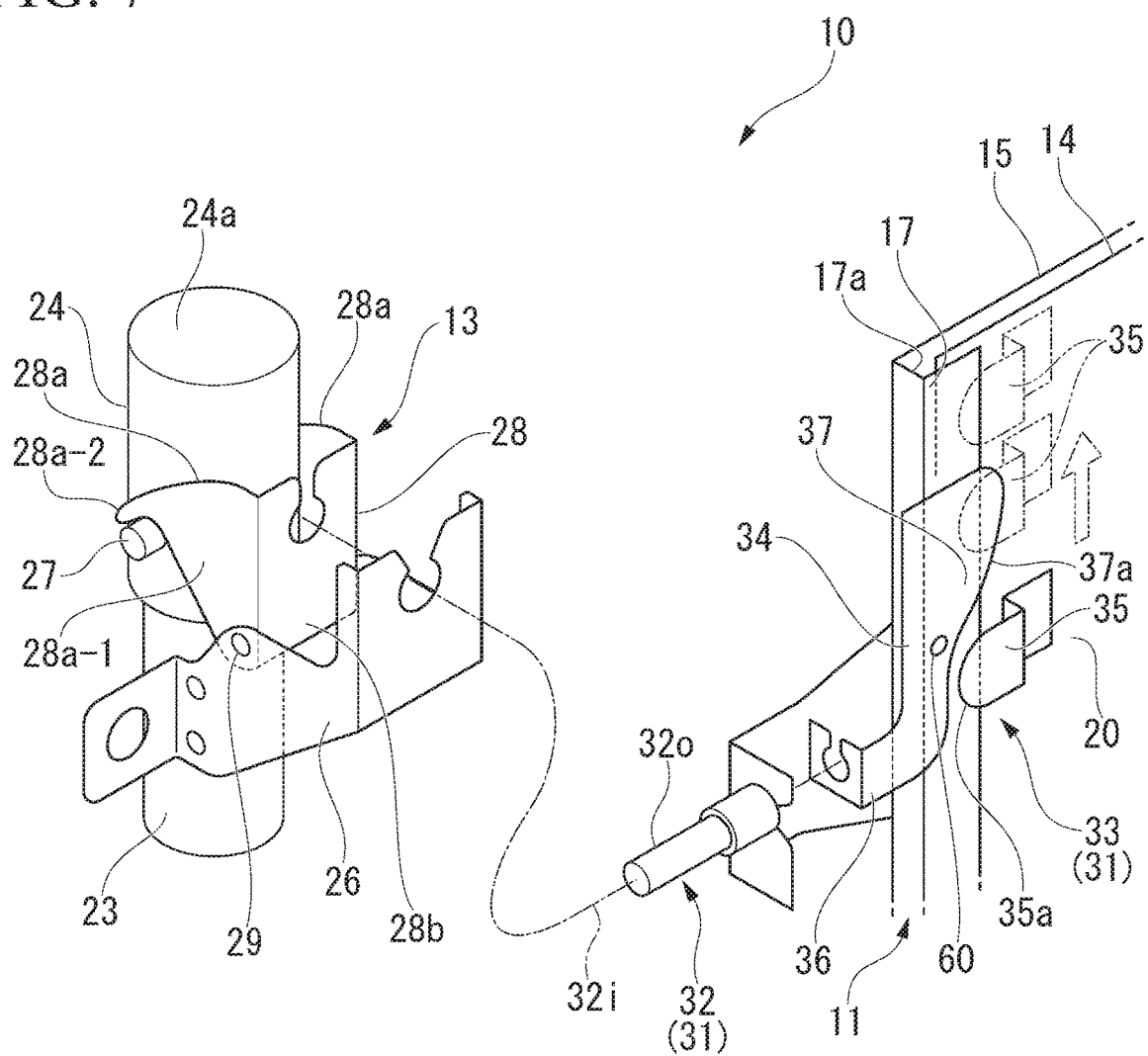
FIG. 7 is a perspective view showing a schematic configuration of the pop-up hood apparatus according to the embodiment.
Figure 8A:
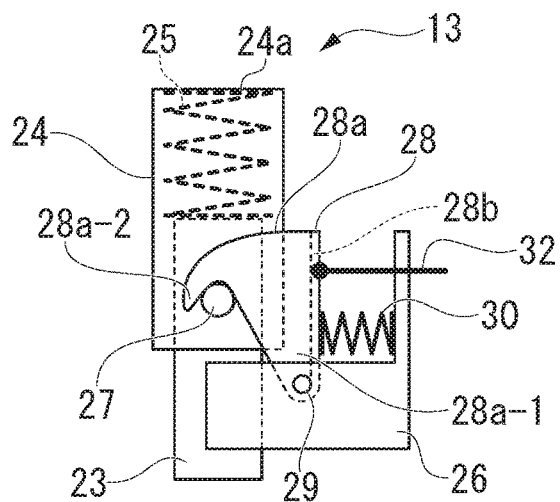
FIG. 8A is a schematic front view of part of an auxiliary support part showing sequentially an operation of the auxiliary support part of the pop-up hood apparatus according to the embodiment.
Figure 8B:
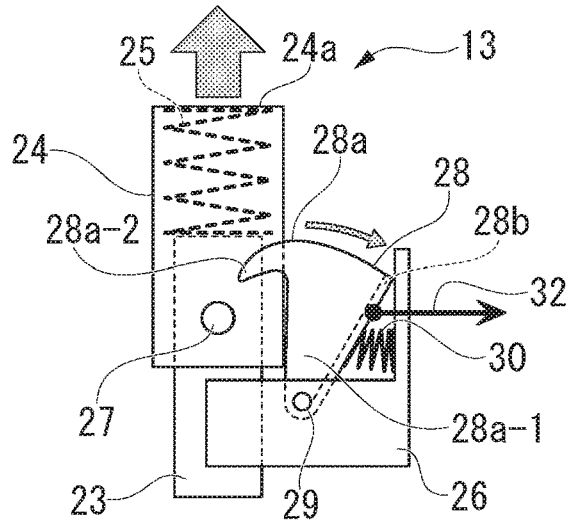
FIG. 8B is a schematic front view of part of the auxiliary support part showing sequentially the operation of the auxiliary support part of the pop-up hood apparatus according to the embodiment.
Figure 8C:
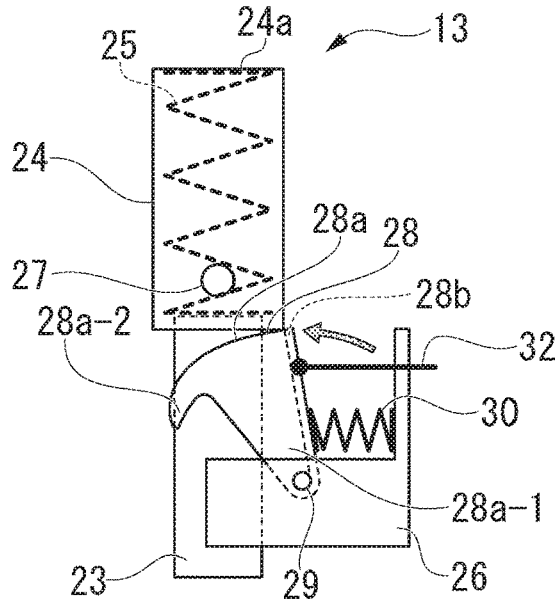
FIG. 8C is a schematic front view of part of the auxiliary support part showing sequentially the operation of the auxiliary support part of the pop-up hood apparatus according to the embodiment.

FIG. 7 is a perspective view showing part of the support mechanism 11 and the auxiliary support part 13. FIGS. 8A to 8C are schematic front views of the auxiliary support part 13 showing the operation of the auxiliary support part 13 in the order of FIG. 8A, FIG. 8B, and FIG. 8C. The auxiliary support parts 13 arranged on the right and left of the vehicle have a similar basic structure.

The auxiliary support part 13 includes a support rod 23 having a cylindrical shape, a load reception block 24 which has a cylindrical shape having a bottom and which is externally fitted into the support rod 23 such that the load reception block 24 is movable upward and downward, and a spring 25 (biasing member) that is provided between the support rod 23 and the load reception block 24 and that biases the load reception block 24 upward. The support rod 23 is attached to the skeleton member at the front part of the vehicle body via a bracket 26. The load reception block 24 has a flat top part 24a that is capable of coming into contact with a lower surface of the side edge part of the hood 4. A pair of locking protrusions 27 are provided to protrude on an outer circumferential surface of the load reception block 24.

The auxiliary support part 13 further includes a displacement regulation member 28 that regulates an upward displacement from an initial position (lower position) of the load reception block 24 against a biasing force of the spring 25.

The displacement regulation member 28 has a pair of lever pieces 28a having a substantially L shape in a front view. The lever pieces 28a are connected to each other by a connection wall 28b. The pair of lever pieces 28a are connected by the connection wall 28b in a state of being arranged parallel to each other and being separated from each other by a distance that is larger than a diameter of an outer circumferential surface of the load reception block 24. An end part (hereinafter, referred to as a "base end part") of a side closer to a part of the pair of lever pieces 28a that is connected by the connection wall 28b is pivotally supported to the bracket 26 by a rotation shaft 29.

The lever piece 28a includes a base wall 28a-1 that stands from the base end part and a locking wall 28a-2 that extends to be bent in a substantially L shape from an upper end part of the base wall 28a-1. As shown in FIGS. 8A to 8C, the displacement regulation member 28 is pivotally biased in one direction around the rotation shaft 29 by the spring 30. The spring 30 is, for example, provided between the connection wall 28b of the displacement regulation member 28 and the bracket 26. As shown in FIG. 8A, the rotational biasing direction of the displacement regulation member 28 by the spring 30 is a direction in which the locking walls 28a-2 of the lever piece 28a is engaged with the locking protrusion 27 of the load reception block 24 from an upper side. The locking wall 28a-2 is engaged with the locking protrusion 27 of the load reception block 24, and thereby, the lever piece 28a regulates an upward displacement from the initial position (lower position) of the load reception block 24 against the biasing force of the spring 25.

As shown in FIG. 8B, when the displacement regulation member 28 receives an external force and is pivotally operated in another direction (opposite to the biasing direction by the spring 30) around the rotation shaft 29, the locking wall 28a-2 of the lever piece 28a is detached from the locking protrusion 27 of the load reception block 24, and an upward displacement of the load reception block 24 by the spring 25 is allowed.

In a state where the load reception block 24 receives the biasing force of the spring 25 and is raised by a predetermined amount or more, as shown in FIG. 8C, when the displacement regulation member 28 again receives the biasing force of the spring 30 and rotates in the one direction, the displacement regulation member 28 moves below the load reception block 24. Thereby, an upper end part of the connection wall 28b of the displacement regulation member 28 comes into contact with a lower surface of the load reception block 24, and the displacement regulation member 28 regulates a downward displacement of the load reception block 24.

The movable block 14 of the support mechanism 11 and the displacement regulation member 28 of each auxiliary support part 13 are interlocked by an interlock part 31. The interlock part 31 displaces the displacement regulation member 28 in a regulation release direction in response to an upward displacement of the movable block 14 by the actuator 12. The interlock part 31 includes an operation cable 32 having one end part that is connected to the connection wall 28b of the displacement regulation member 28 and an operation conversion part 33 that converts the upward displacement of the hood lock mechanism 9 into a retraction operation of another end part of the operation cable 32.

The operation cable 32 includes an inner cable 32i and an outer tube 32o that slidably holds the inner cable 32i. The inner cable 32i is connected to the connection wall 28b of the displacement regulation member 28 and a cable retraction lever 34 described below of the operation conversion part 33.

Figure 9A:
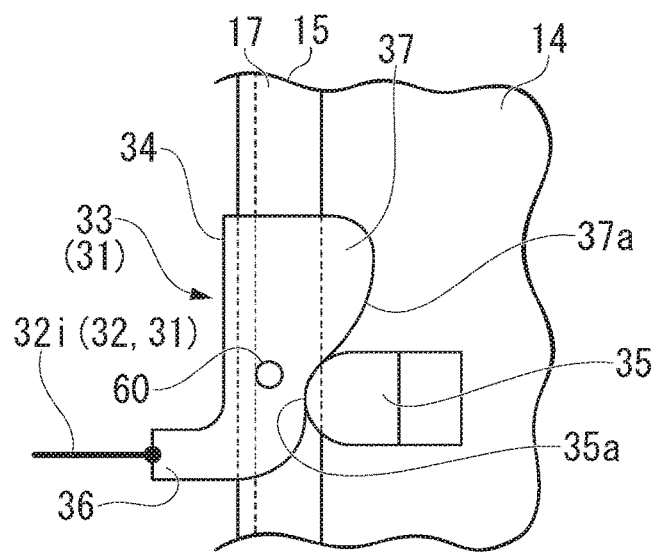
FIG. 9A is a schematic front view of an operation conversion part showing sequentially an operation of the operation conversion part of the pop-up hood apparatus according to the embodiment.
Figure 9B:
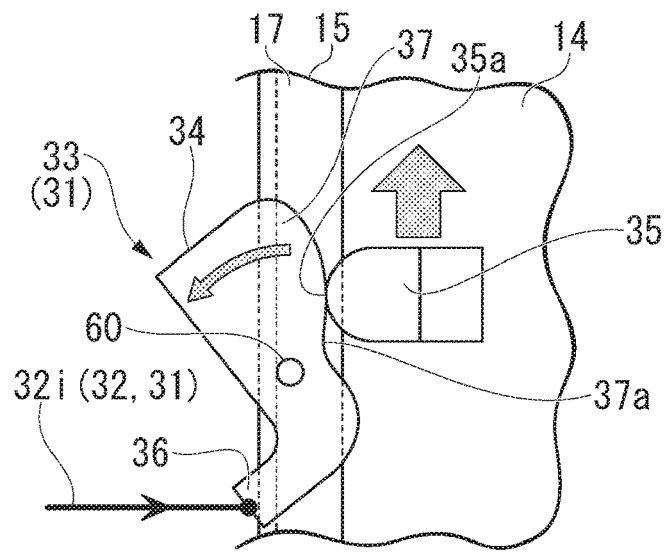
FIG. 9B is a schematic front view of the operation conversion part showing sequentially the operation of the operation conversion part of the pop-up hood apparatus according to the embodiment.
Figure 9C:
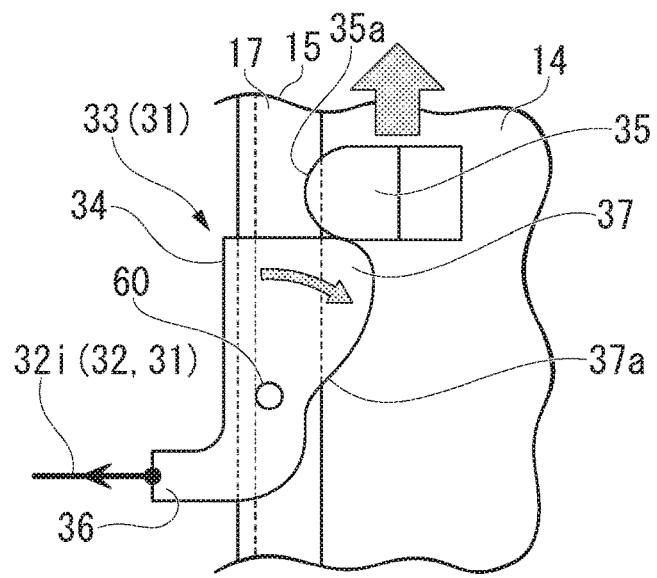
FIG. 9C is a schematic front view of the operation conversion part showing sequentially the operation of the operation conversion part of the pop-up hood apparatus according to the embodiment.

FIGS. 9A to 9C are schematic front views of the operation conversion part 33 showing the operation of the operation conversion part 33 in the order of FIG. 9A, FIG. 9B, and FIG. 9C. In FIG. 3 to FIG. 5, the description of the operation conversion part 33 is omitted for convenience.

As shown in FIG. 7 and FIGS. 9A to 9C, the operation conversion part 33 includes the cable retraction lever 34 that is pivotally supported on a side edge part of the base block 15 of the support mechanism 11 and an operation transmission piece 35 that is arranged on and fixed to the movable block 14 of the support mechanism 11. The cable retraction lever 34 is pivotally supported by a support shaft 60 that is provided to protrude on a front surface of the side edge part of the base block 15. The cable retraction lever 34 includes a cable connection part 36 to which the other end of the operation cable 32 (inner cable 32i) is connected and an operation control part 37 having a cam surface 37a. The operation transmission piece 35 on the movable block 14 side is capable of coming into contact with the cam surface 37a of the operation control part 37. A curve part 35a that comes into contact with the cam surface 37a is formed on the operation transmission piece 35.

In the present embodiment, the cam surface 37a of the cable retraction lever 34 and the curve part 35a of the operation transmission piece 35 constitute a cam mechanism.

The cable retraction lever 34 is biased by a spring (not shown) in a direction in which the cam surface 37a comes into contact with the curve part 35a of the operation transmission piece 35. The cam surface 37a is formed in a curved shape such that, when the operation control part 37 is in the initial condition shown in FIG. 9A, a projection amount toward an inward direction in the vehicle width direction from the support shaft 60 is gradually increased from a lower side toward an upper side. Therefore, when the operation transmission piece 35 moves upward together with the movable block 14 as shown in FIG. 9B from the initial state shown in FIG. 9A, the operation control part 37 is pressed by the operation transmission piece 35 via the cam surface 37a. As a result, the cable retraction lever 34 is rotated in a direction opposite to the biasing force of the spring, and the cable connection part 36 pulls the other end of the operation cable 32 (inner cable 32i).

As shown in FIG. 9C, when the operation transmission piece 35 moves upward beyond the cable retraction lever 34, the pressing of the cam surface 37b by the operation transmission piece 35 is eliminated, and the cable retraction lever 34 receives the biasing force of the spring and returns to the initial position direction. As a result, the retraction of the other end of the operation cable 32 (inner cable 32i) by the cable connection part 36 is released.

(Operation of Pop-Up Hood Apparatus)

As shown in FIG. 2, when an impact F1 is input to the front bumper during traveling of the vehicle 1, the pop-up hood apparatus 10 operates as described below.

First, when the impact F1 is input to the front bumper, an impact detection sensor detects the input of the impact F1, and the actuator 12 at the front middle part of the vehicle body operates on the basis of a command by the controller. When the actuator 12 operates, the wedge part 12a of the actuator 12 passes between the pair of locking claws 22 of the support mechanism 11, and at that time, the locking claw 22 is slid in a locking release direction. Thereby, the locking of the movable block 14 by the locking claw 22 is released, and an upward displacement of the movable block 14 becomes possible. After passing between the pair of locking claws 22, the wedge part 12a of the actuator 12 comes into contact with the load reception member 21 from below and pushes the movable block 14 upward via the load reception member 21. As a result, the hood lock mechanism 9 that is supported by the movable block 14 moves upward together with the hood 4.

On the other hand, when the movable block 14 begins to move upward by the pushing-up by the actuator 12, as shown in FIG. 9B, the cable retraction lever 34 of the operation conversion part 33 is pressed by the operation transmission piece 35 and pivots in a cable retraction direction. Thereby, the operation cable 32 is retracted, and the displacement regulation member 28 of the right and left support mechanisms 11 is pivotally operated in the other direction against the biasing force of the spring 30 as shown in FIG. 8B. As a result, the engagement of the lever piece 28a of the displacement regulation member 28 with the locking protrusion 27 of the load reception block 24 is disconnected, and the load reception block 24 is displaced upward by receiving the biasing force of the spring 25. The load reception block 24 displaces upward in accordance with the elevation of the hood 4, and the top part 24a of the load reception block 24 comes into contact with the lower surface of the side edge part of the hood 4.

When the hood 4 is raised by a predetermined amount or more together with the hood lock mechanism 9 (movable block 14 of the support mechanism 11) by the operation of the actuator 12, as shown in FIG. 9C, the operation transmission piece 35 displaces upward beyond the cable retraction lever 34, and the cable retraction lever 34 pivots in a direction in which the retraction of the operation cable 32 is released.

On the other hand, at this time, the load reception block 24 of the right and left auxiliary support parts 13 is displaced upward beyond the displacement regulation member 28. When the retraction of the operation cable 32 is released in this state, as indicated by an arrow in FIG. 8C, the displacement regulation member 28 receives the biasing force of the spring 30 and pivots so as to move below the load reception block 24. From this state, when the load reception block 24 begins to move downward together with the hood 4, as shown in FIG. 8C, the upper end part of the connection wall 28b of the displacement regulation member 28 comes into contact with the lower surface of the load reception block 24. As a result, the displacement regulation member 28 is interposed between the rotation shaft 29 and the lower surface of the load reception block 24, and the side edge part of the hood 4 is supported from below by the displacement regulation member 28. Accordingly, the front edge part of the hood 4 is stably held by the right and left auxiliary support parts 13.

Next, from this state, when a large impact F2 is input to the upper surface of the hood 4 from above, the impact F2 is flexibly absorbed by deformation of the hood 4 or the support part of the hood 4. In particular, in the right and left auxiliary support parts 13, when the impact F2 that acts on the hood 4 acts on the displacement regulation member 28 via the load reception block 24, it is possible to effectively absorb the energy of the impact by plastic deformation of the displacement regulation member 28.

Accordingly, it is possible to further effectively absorb the impact F2 by appropriately setting a withstand load of the displacement regulation member 28.

Effect of Embodiment

The pop-up hood apparatus 10 of the present embodiment has a configuration in which, in a case where a predetermined condition is satisfied in an emergency or the like, the load reception block 24 of the auxiliary support part 13 on both sides in the vehicle width direction receives the biasing force of the spring 25 and moves upward in conjunction with the operation of a middle actuator 12. Therefore, when the pop-up hood apparatus 10 of the present embodiment is employed, the number of expensive actuators installed becomes one, and it is possible to reduce manufacturing costs of the apparatus.

In the pop-up hood apparatus 10 of the present embodiment, since the pair of auxiliary support parts 13 can support the side edge parts on both sides in the vehicle width direction of the hood 4 from below at the time of operation of the actuator 12, it is possible to stably receive an impact that is input from above the hood 4 in a case where a predetermined condition is satisfied in an emergency or the like.

Further, in the pop-up hood apparatus 10 of the present embodiment, the interlock part 31 includes the operation cable 32 and the operation conversion part 33, the one end part of the operation cable 32 is connected to the displacement regulation member 28, and the operation conversion part 33 converts the upward displacement of the hood lock mechanism 9 into the retraction operation of the other end part of the operation cable 32. Therefore, the upward displacement of the hood lock mechanism 9 at the substantially middle part in the vehicle width direction is subjected to the operation conversion and can be then transmitted via the operation cable 32 having a high degree of freedom of deformation to the displacement regulation member 28 at the side part in the vehicle width direction. Accordingly, when the present configuration is employed, it is possible to arrange a device component relatively easily even in a vehicle having a limited arrangement space.

In particular, in the pop-up hood apparatus 10 of the present embodiment, since the operation conversion part 33 is constituted of the cable retraction lever 34 of which the amount of rotation is controlled by the cam mechanism (the curve part 35a and the cam surface 37a), the retraction of the operation cable 32 can be controlled with good accuracy by the shape of the cam surface 37a. Accordingly, when the present configuration is employed, it is possible to displace the displacement regulation member 28 as desired in accordance with the upward displacement of the hood 4.

Further, in the pop-up hood apparatus 10 of the present embodiment, when the predetermined condition is satisfied in an emergency or the like and when the load reception block 24 is displaced upward by a predetermined amount or more, the displacement regulation member 28 as a load support part comes into contact with the lower surface of the load reception block 24, and the downward movement of the side edge part of the hood 4 is regulated. Accordingly, when the present configuration is employed, an impact that is input from the upward direction of the hood 4 can be further stably supported at the side edge part of the hood 4.

Further, in the present embodiment, the displacement regulation member 28 is constituted of a plate material made of metal, and the displacement regulation member 28 is plastic-deformed when a large load is input from above via the load reception block 24. Therefore, when a large impact is input to the hood 4 from above, the energy of the impact can be effectively absorbed by the displacement regulation member 28.

Further, in the present embodiment, when the predetermined condition is satisfied in an emergency or the like and when the load reception block 24 is displaced upward by a predetermined amount or more, the displacement regulation member 28 as a load support part comes into contact with the lower surface of the load reception block 24; however, it is also possible to provide a dedicated load support part that comes into contact with the lower surface of the load reception block 24 when the load reception block 24 is displaced upward by a predetermined amount or more. However, in a case where the displacement regulation member 28 is made to function as the load support part as in the present embodiment, since it is not necessary to separately provide a dedicated load support component that regulates downward movement of the hood 4, it is possible to reduce manufacturing costs and reduce the size and weight of the apparatus by reducing configuration components.

The present invention is not limited to the above-described embodiment, and various design changes can be made without departing from the scope of the invention. For example, in the above-described embodiment, the interlock part 31 is constituted of the operation cable 32 and the cable retraction lever 34 that is the operation conversion part 33; however, the interlock part is not limited to these configurations and may have, for example, a configuration in which the upward displacement of the movable block is converted into a rotation of a pinion by a rack-and-pinion mechanism, and an operation cable is drawn by the rotation of the pinion. Further, the upward displacement of the movable block may be detected by the sensor, and the displacement regulation member may be operated in the regulation release direction by the actuator in response to the detection result.

What is claimed is:

1. A vehicle pop-up hood apparatus, comprising:
a hood that closes an opening part at an outer part of a vehicle body;
a hood lock mechanism that fixes a substantially middle part in a vehicle width direction of the hood to the vehicle body;
a support mechanism having a movable block that supports the hood lock mechanism and a base block that is fixed to the vehicle body and that supports the movable block such that the movable block is movable upward and downward;
an actuator that displaces the movable block upward in a case where a predetermined condition is satisfied; and
a pair of auxiliary support parts that support side edge parts on both sides in the vehicle width direction of the hood from below when the hood is displaced upward by an operation of the actuator,
wherein the auxiliary support parts each comprise
a load reception block that is capable of supporting the side edge part of the hood from below;
a biasing member that biases the load reception block upward; and
a displacement regulation member that regulates an upward displacement from an initial position of the load reception block against a biasing force of the biasing member,
wherein the movable block and the displacement regulation member are interlocked by an interlock part that displaces the displacement regulation member in a regulation release direction in response to an upward displacement of the movable block by the actuator,
wherein the interlock part comprises
an operation cable having one end part that is connected to the displacement regulation member, and
an operation conversion part that converts the upward displacement of the movable block into a retraction operation of another end part of the operation cable, and
wherein the operation conversion part comprises
a cable retraction lever which is pivotally supported on a side edge part of the base block and of which a rotation amount is controlled by a cam mechanism, and
an operation transmission piece that is arranged on and fixed to the movable block and rotates the cable retraction lever.

2. The vehicle pop-up hood apparatus according to claim 1, wherein the predetermined condition is a condition for determining an emergency.

3. The vehicle pop-up hood apparatus according to claim 1, further comprising:
a load support part that comes into contact with the vehicle body and a lower surface of the load reception block such that a load is transmittable to the vehicle body and the lower surface of the load reception block in response to an upward displacement of the load reception block by a predetermined amount or more.

4. The vehicle pop-up hood apparatus according to claim 3, wherein the load support part comprises the displacement regulation member.

* * * * *